April 3, 1951 R. W. ANDREASSON 2,547,845
APPARATUS FOR RELIEVING THE TEETH OF
CIRCULAR CUTTING ELEMENTS
Filed March 4, 1948 5 Sheets-Sheet 1
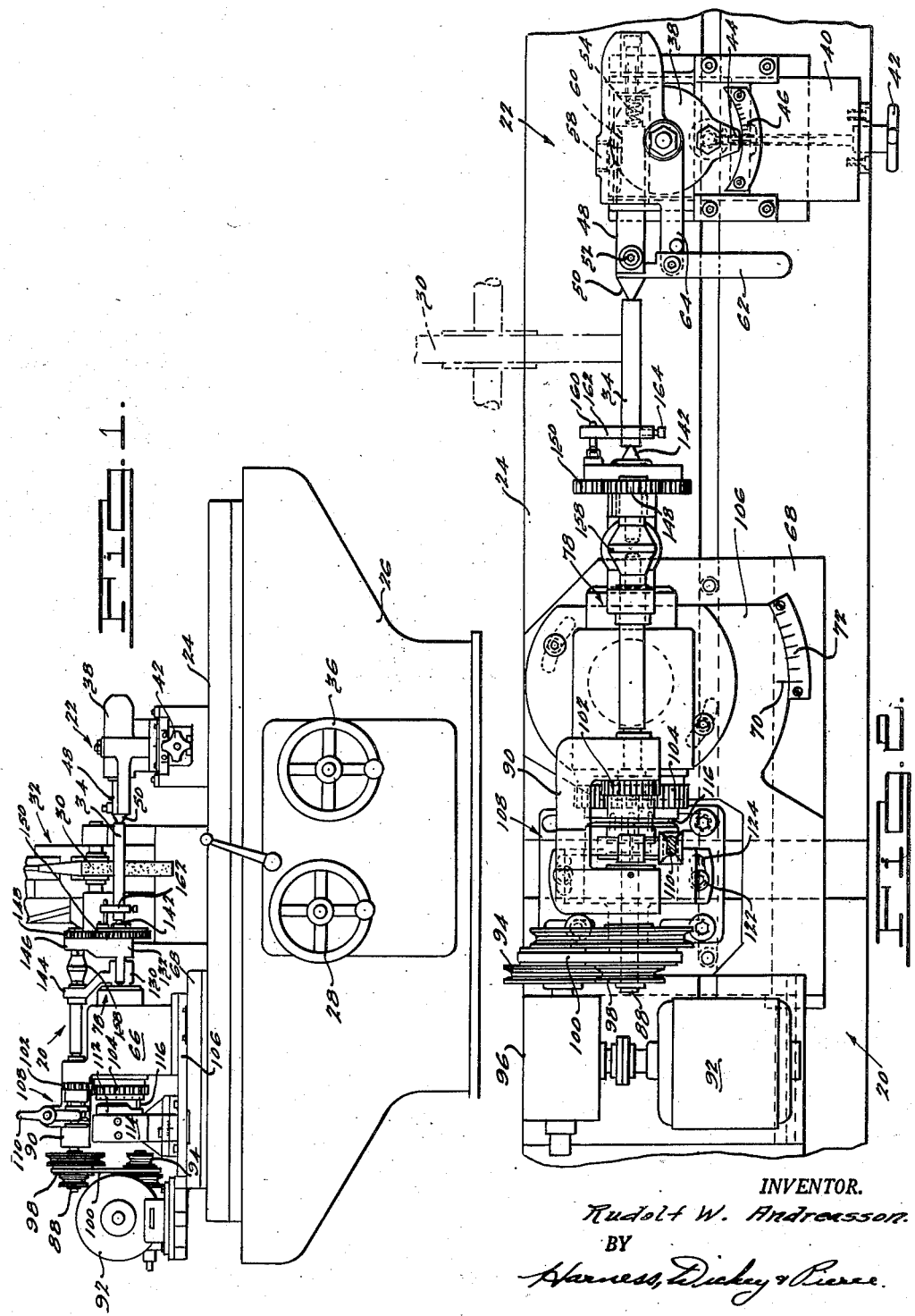
INVENTOR.
Rudolf W. Andreasson.
BY
Harness, Dickey & Pierce.
ATTORNEYS.

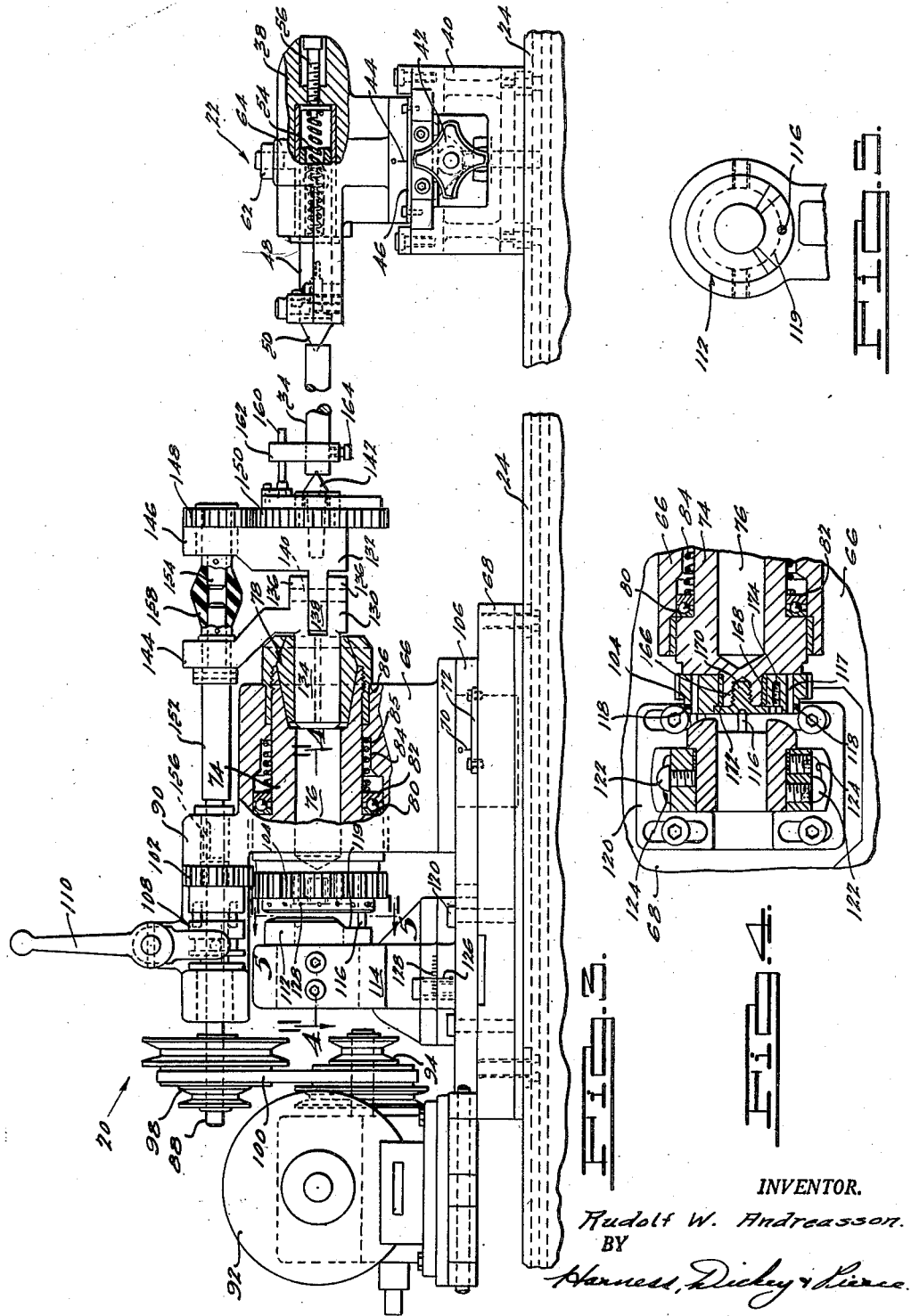

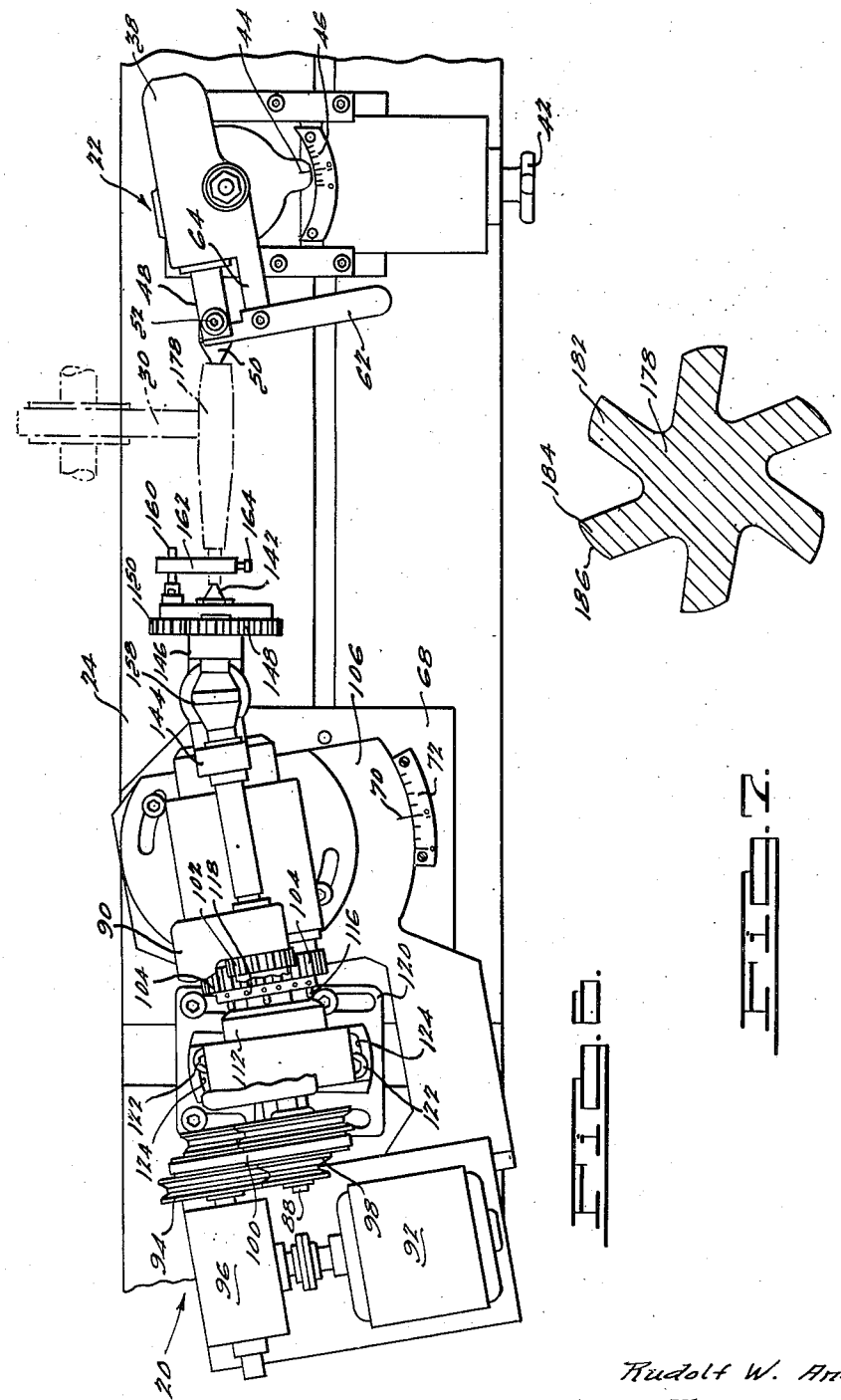

INVENTOR.
Rudolf W. Andreasson.
BY
Harness, Dickey & Pierce
ATTORNEYS.

April 3, 1951     R. W. ANDREASSON     2,547,845
APPARATUS FOR RELIEVING THE TEETH OF
CIRCULAR CUTTING ELEMENTS Filed March 4, 1948     5 Sheets-Sheet 5

INVENTOR.
Rudolf W. Andreasson
BY
Harness, Dickey & Pierce
ATTORNEYS.

Patented Apr. 3, 1951

2,547,845

UNITED STATES PATENT OFFICE 2,547,845

APPARATUS FOR RELIEVING THE TEETH OF CIRCULAR CUTTING ELEMENTS

Rudolf William Andreasson, Franklin, Mich.

Application March 4, 1948, Serial No. 12,934

9 Claims. (Cl. 51—95)

This invention relates broadly to grinding machines and more particularly to a machine of this character which is primarily adapted and pre-eminently suited for backing off or relieving the teeth of rotary cutters such as reamers, milling cutters and the like.

This is a continuation in part application of my copending application, Serial No. 789,456 which was filed December 3, 1947, now abandoned.

An important object of the present invention is to provide a grinding machine that is exceedingly versatile and capable of performing a wide variety of grinding operations.

Another object of the invention is to provide a grinding machine which is automatic in operation to provide a desired relief for the teeth of cutting elements.

Still another object of the invention is to provide a grinding machine of the above mentioned character which is operable to grind a different relief or clearance on different teeth of a single cutting element.

Yet another object of the invention is to provide a grinding machine that can be easily and quickly adapted for grinding either with or without centers.

A further object of the invention is to provide a grinding machine having a headstock which is uniquely constructed for grinding without centers and which will support relatively long workpieces without excessive overhang.

A still further object of the invention is to provide a grinding machine of the above mentioned character in which the drive shaft for the center point of the headstock includes a torsionally yieldable flexible coupling which yields under heavy cuts in a direction to relieve pressure on the grinding wheel whereby to prevent burning of the tool and which permits the tool to assume its proper angular position as soon as pressure on the work is reduced.

A yet further object of the invention is to provide a grinding machine of the above-mentioned character that is operative to grind simultaneously end clearance and a predetermined relief on the outside diameter of the work, and which is adjustable to vary either relief independently of the other.

Other objects and advantages of the invention will be apparent during the course of the following description.

In the drawing forming a part of this specification and wherein like numerals are employed to designate like parts throughout the same, Fig. 1 is a side elevational view of a grinding machine embodying the invention and showing the same set up for ordinary circle grinding;

Fig. 2 is a top plan view thereof;

Fig. 3 is an enlarged, fragmentary, side elevational view illustrating the head and tailstock assemblies of the machine, parts thereof being broken away and shown in section;

Fig. 4 is a fragmentary, horizontal, longitudinal, sectional view taken on the line 4—4 of Fig. 3;

Fig. 5 is a fragmentary, vertical, transverse sectional view taken on the line 5—5 of Fig. 3;

Fig. 6 is a fragmentary, top plan view of the grinding machine showing the same set up to relieve the teeth of cutting elements;

Fig. 7 is a transverse sectional view through a cutting element of the type adapted to be acted upon by the machine when the latter is set up as shown in Fig. 6;

Figure 8:
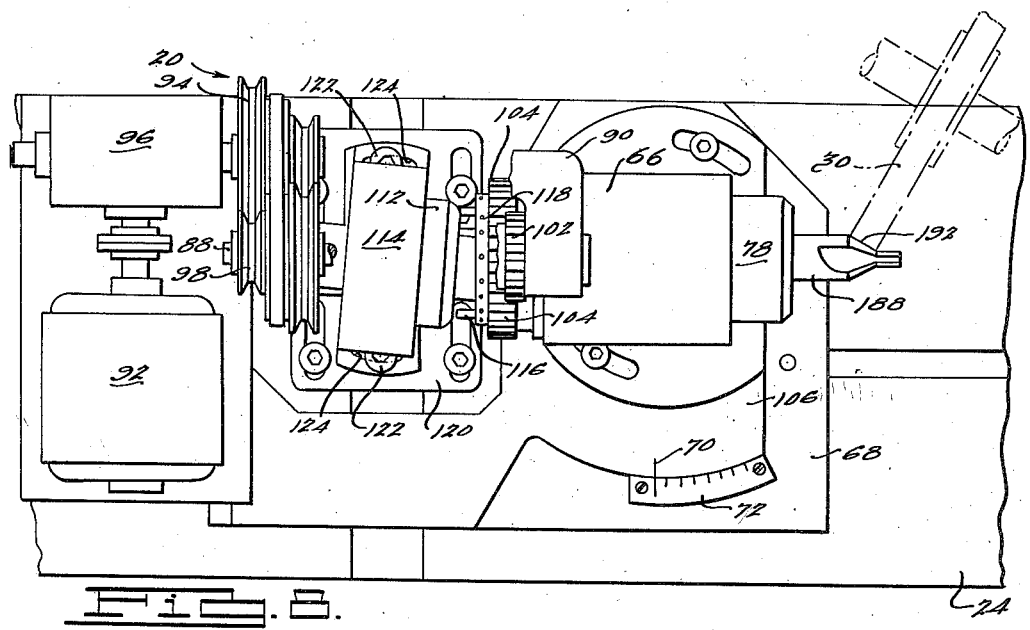
Fig. 8 is a fragmentary, top plan view of the grinding machine showing the headstock adapted for grinding without centers and illustrating a typical grinding operation to be performed by this set up.

The grinding machine shown in the drawing is an improvement over the machine shown in my prior Patent No. 2,389,401 which issued November 20, 1945. Broadly, a headstock 20 and a tailstock 22 embodying the present invention are carried by the usual table 24, and the latter is longitudinally movable in the conventional manner on a suitable base 26 by handwheel 28. A rotatably driven grinding wheel 30 is carried by the usual supporting structure 32 and the latter is movable in the conventional manner transversely on the base 26 and relative to workpiece 34 by a handwheel 36. Preferably, the grinding wheel 30 also is angularly adjustable about a vertical axis on the supporting structure 32.

The tailstock 22 is generally similar to the one shown in my prior patent hereinabove referred to, and comprises a support 38 mounted for angular movement about a vertical axis on a base 40 which in turn is fastened on and movable with the table 24. Angular adjustment of the support 38 is effected by means of a handwheel 42 and the amount of such angular movement is indicated in an obvious manner by reference mark 44 and a scale 46 (Figs. 2 and 3).

Mounted for horizontal sliding movement in the support 38 is a center member 48 which carries the usual center point 50. According to the present invention, however, the center point 50 is mounted on the center member 48 for angular movement about a vertical pivot 52 so that the center point can be angularly adjusted to compensate for angular movement of the support 38 on the base 40. A coil spring 54 behind the center member 48 urges the latter outwardly or to the left as viewed in Fig. 3, and the tension of the spring is regulated by the usual adjusting screw 56. A set screw 58 (Fig. 2) carried by the support 38 extends into a longitudinal slot 60 in the center member 48 and prevents the latter from rotating while permitting free sliding movement thereof axially in the support.

The center member 48 can be readily retracted against the action of spring 54 to release workpiece 34 by a manually operable lever 62. As best shown in Fig. 2, the lever 62 is pivoted on a supporting arm 64 which is formed integrally on the support 38 and bears against the forward or inner end of the center member.

The headstock 20 comprises a support 66 which is mounted on a plate member 106 and the latter is carried by a base plate 68 for angular movement about a vertical axis. In the form of the invention here shown, the support 66 is fastened to the plate member 106 by screws 67 so that these members turn as a unit on the base plate 68. The support and plate are held in the selected angularly adjusted position by screws 69 which extend through arcuate slots 71 in the support and supporting plate member and into the base plate 68. The base plate 68 is suitably fastened to the table 24, and the angular position of the plate member 106 on the base plate is indicated in the usual manner by a reference mark 70 and a scale 72 (Figs. 2 and 3). According to the present invention, a spindle 74 (Fig. 3) is mounted in the support 66 both for rotation about and for reciprocation along a horizontal axis. A relatively deep socket 76 is provided in the inner end of spindle 74; and a draw collet designated generally by the numeral 78, is mounted on such inner end to clamp a workpiece or other object inserted into the socket. Adjacent the outer or rearward end thereof, the spindle 74 is formed with a radial shoulder 80 which seats a thrust bearing 82, and a coil spring 84 confined between the bearing 82 and an annular shoulder 85 in the support 66 urges the spindle 74 constantly axially to the left as viewed in Fig. 3 without interfering with rotation of the spindle. Axial movement of the spindle 74 to the left is limited by a radially extending annular shoulder 86 on the drawn collet 78.

A rotary drive for the spindle 74 comprises a horizontal drive shaft 88 which is rotatably supported by a U-shaped bracket 90 formed integrally on the support 66. A motor 92 drives a pulley 94 through a gear reduction unit 96 and the pulley 94 is connected to a second pulley 98 on the drive shaft 88 by an endless belt 100. A gear 102 fixed on the drive shaft 88 meshes with a gear 104 on the rearward end of spindle 74 to transmit motion from the drive shaft to the spindle. In this connection, it will be observed that the motor 92 is mounted on an extension of the supporting plate 106 so that the motor and the support 66 turn as a unit when the supporting plate is adjusted angularly on the base plate 68 in the manner hereinabove described.

Preferably, the drive shaft 88 is formed in two sections. One section of the drive shaft 88 is supported by each arm of the U-shaped bracket 90, and the two sections are selectively connected or disconnected by a clutch 108 which may be of any usual or conventional design and is actuated manually by a suitable handle 110. As a result of this construction, the motor 92 can be operated continuously and the spindle 74 rotated as desired by engaging or disengaging the clutch 108.

Axial movement of the spindle 74 against the action of spring 84 is effected by a cam 112, which cam is mounted in a cam support 114 directly behind the spindle and has a vertically disposed, annular cam face which is engaged by one or more cam followers 116 carried by and projecting axially from the spindle. In the form of the invention here shown by way of illustration, the cam followers 116 merely comprise metal pins which fit in sockets 117 provided in the adjacent end of the spindle 74 (Figs. 3 and 4). These pins ride on the cam face during rotation of the spindle 74 and, by following the contour of the cam 112 impart a reciprocating motion to the spindle.

Preferably, an annular series of sockets 117 is provided in the end of spindle 74 so that any desired number of pins 116 can be provided and so that the pins can be arranged in any suitable angular relation around the spindle. Also, the sockets 117 preferably are provided with radial set screws 118, which are adapted to be tightened against the pins 116 to hold the latter fixedly associated with the spindle 74.

The cam 112 shown in Figs. 1–5 has an annular cam face all of which lies in a single plane except for an axially offset or recessed segmental portion 119. Also, in these figures of the drawing a single pin 116 is shown in the gear 104. This arrangement causes the spindle 74 to advance axially each time the pin 116 rides out of the recessed portion 119 and to remain in the advanced position until the pin again rides down into the recessed portion. Thus, the spindle 74 is caused to advance and retract once for each revolution of the gear 104. This motion is suitable for grinding many types of cutting elements.

It is a feature of this invention that the cam support 114 is independently, angularly adjustable about a vertical axis so that the cam face may be cocked at an angle with respect to the adjacent end of spindle 74 to control the length of the reciprocatory motion imparted to the spindle. To this end, the cam support 114 is mounted on a suitable plate member 120, and screws 122 extend downwardly into the plate through arcuate slots 124 provided in the base of support 114 (Fig. 2). A reference mark 126 on the plate 120 cooperates with a scale 128 on the support 114 to indicate the angular setting of the support. In this connection it will be noted (Fig. 3), that the scale 128 is disposed on both sides of the zero mark to indicate the angular position of cam support 114 when the latter is turned either to the right or to the left of neutral position. When both supports 66 and 114 are at zero reading on their respective scales 72 and 128, the cam 112 is disposed in axial alignment with the spindle 74 and the latter is disposed in axial alignment with the center point 50 of tailstock 22. The plate member 120 is fastened to the base plate 68 by screws 121, and the latter extend through transversely elongated slots 123 which permit adjustment of the cam support 114 laterally on the machine.

For certain types of grinding without centers, the workpiece can be mounted directly in the spindle 74 and clamped tightly by the draw collet 78 in the manner hereinabove described. However, for other types of grinding without centers or for grinding between centers, an additional attachment is required which is now described in detail, and an adaptation of the general mechanism of the machine is necessary.

The center unit for headstock 20 comprises a mounting bracket having swiveled sections 130 and 132. As best shown in Fig. 3, the rear bracket section 130 is formed with a shank 134 which is adapted to be received in socket 76 and to be tightly clamped by draw collet 78. At its forward end, the rear bracket section 130 is provided with bifurcations 136 which embrace a projecting tongue 138 on the front bracket section 132. A pivot pin 140 extends through the bifurcations 136 and tongue 138 to complete the swivel connection. In practice the attachment is positioned as shown in the drawing with the pivot 140 disposed vertically with respect to the table 24 so that the front bracket section 132 can swing in a horizontal plane about the pivot. A center point 142 is mounted for rotation in the front bracket section 132; and, when the parts of the machine are positioned as shown in Figs. 1–5 of the drawing, the center point 142 is in axial alignment with the corresponding center point 50 of tailstock 22.

In order to rotatably drive the center point 142, a driven shaft is journaled for rotation in upwardly extending arms 144 and 146 which are formed integrally on respective bracket sections 130 and 132, and the driven shaft is connected to the center point 142 through spur gears 148 and 150. As perhaps best shown in Fig. 3, the driven shaft comprises two separate axially aligned sections 152 and 154 which are journaled in arms 144 and 146 respectively. The rear terminal portion of shaft section 152 is removably received in a socket provided in the forward end of drive shaft 88. Any suitable connection such as a key or spline may be provided between the drive and driven shafts to establish a direct rotary drive therebetween but permit the driven shaft to be pulled axially from the drive shaft. In the drawing (Fig. 3), I have shown a key 156 of conventional design connecting the drive shaft 88 to the driven shaft section 152. The gear 148 is fixed on the forward end of the front shaft section 154, and this gear meshes with the gear 150 which is fixed in any suitable manner on the center point 142.

It is a feature of this invention that the two shaft sections 152 and 154 are connected by a torsionally yieldable, flexible coupling 158 of rubber or the like. This construction provides a constant velocity drive for the center point 142 regardless of the angular position of the front bracket section 132 about pivot 140. Also, an additional and perhaps even more important result is achieved in that the coupling 158 will yield under heavy cuts in a direction to relieve pressure on the grinding wheel 30 whereby to prevent burning of the tool or work 34. Further, as pressure against the work 34 is reduced, the torsionally flexed coupling 158 causes the work to catch up to the proper angular position for the required operation.

Any suitable form of driving connection may be employed between the center point 142 or gear 150 and the work 34. For the purpose of illustration, I have here shown a conventional dog 160 fastened to the gear 150 laterally of center point 142, which dog projects forwardly past the center point and engages a radially projecting bracket 162 mounted on the adjacent end of the tool 34 and removably fastened thereto by a set screw 164.

When the center attachment is employed on the headstock 20 it is necessary to disengage the driven gear 104 from spindle 74, since it obviously is not intended for the spindle to rotate the mounting bracket 130, 132. As shown in Fig. 4, the gear 104 is mounted on an axially projecting shank 166 at the rearward end of spindle 74, and an "Oilite" bearing 168 is interposed between the gear and the shank to permit substantially frictionless rotation of the gear. Also, it will be observed that a screw 170 is threaded axially into the shank 166 and that the screw is provided with a relatively large head 172 which overlays the inner annular marginal portion of the gear to hold the latter on the shank. Preferably, the head 172 is countersunk to extend flush with the outer face of the gear 104, as clearly shown in the drawing. Also, a screw 174 is threaded into the gear 104 beside the center screw 170 and the head of screw 174 is received in a peripheral notch provided in the head 172. When screw 174 is threaded into the gear 104, it transmits rotation from the spindle 74 to the gear through screw 170 in an obvious manner. However, when screw 174 is removed, the gear 104 is free to rotate on the shank 166 independently of spindle 74.

When the machine is adapted for center grinding as shown in Figs. 1–5, the screw 174 is removed so that drive shaft 88 simultaneously rotates gear 104 and center point 142 without rotating the spindle 74. On the other hand, when the machine is set up for grinding without centers, the center point unit is removed from the spindle 74, the tool is clamped in the spindle by draw collet 78, and screw 174 is inserted to lock the gear 104 to the spindle. When the parts are thus assembled, the drive shaft 88 acts through gears 102 and 104 to rotatably drive the spindle 74 and consequently the tool carried thereby in the manner hereinabove described.

As suggested, a primary feature of the instant grinding machine resides in its versatility and in its adaptability for performing different types of grinding operations. The machine is designed for grinding either with centers or without centers and is capable of grinding a wide variety of workpieces. Obviously, a machine adapted to perform grinding operations which heretofore required several machines is of considerable value to manufacturers. This is particularly true when it is considered that grinding machines of this type are relatively expensive.

The arrangement of the cam 112 behind the spindle 74 is productive of new and beneficial results. By positioning the cam 112 in this manner, the spindle 74 can be made of large diameter and relatively long so as to easily accommodate and solidly support relatively long workpieces. Heretofore, when grinding without centers, it has been difficult to operate on long workpieces since in most instances the latter could not be fastened to the head chuck without excessive overhang. If the work extends too far out of the chuck, vibrations are set up during grinding which cause destructive chattering to occur, and the result is a poor if not faulty grinding operation. As a result of the instant construction, however, the spindle 74 can be made sufficiently long to accommodate any usual or conventional size of work and the work can be set far enough back into the spindle to eliminate the excessive overhang which so often is responsible for poor work and faulty operation. The collect chuck 78 grips the workpiece solidly at the point where it projects from the headstock and holds the same properly for the grinding operation. At the same time, axial manipulation of the spindle and consequently of the workpiece can be readily achieved.

In Figs. 1-5 the machine is shown set up for ordinary circle grinding. The workpiece 34 is mounted between the center points 50 and 142 and the screw 174 is removed to release gear 104 from spindle 74. When clutch 110 is operated to engage the two sections of drive shaft 88, gears 102 and 148 rotatably drive gears 104 and 150 respectively and the latter gear rotatably drives the workpiece 34.

Ordinarily, in this type of grinding it is desirable to merely rotate the workpiece without reciprocation, and no reciprocation of the spindle 74 or workpiece 34 will occur if all of the pins 116 are removed from the gear 104, if cam 112 is removed from the support 114, or if a "no cam" type of cam is employed and arranged in axial alignment with the spindle.

On the other hand, it may be desirable at times to reciprocate the work simultaneously with the grinding operation. In this connection, it will be readily apparent that any desired reciprocatory movement of the workpiece 34 may be effected by employing a cam 112 in which the cam face has the necessary predetermined rise and fall in combination with a suitable number and arrangement of pins 116.

Automatically backing off or relieving the teeth of cutting tools such as the reamer 178 shown by way of example in Fig. 7 is a typical example of a grinding operation in which the work is simultaneously rotated and reciprocated. To perform this type of operation, the workpiece is mounted between center points 50 and 142 and the machine is set up as shown in Fig. 6. Specifically, the tailstock support 38 and the headstock mounting plate 106 are angularly adjusted a predetermined number of degrees in the same direction. In the drawing (Fig. 6), both the headstock and the tailstock are shown adjusted 10°. Angular adjustment of the headstock and the tailstock in this manner brings the center support 48 and the spindle 74 at a corresponding angle with respect to the longitudinal axis and direction of travel of the table 24. The tailstock center point 50 is then swiveled in a direction to compensate for the angular adjustment of the support 38, and the headstock mounting bracket 32 is similarly swiveled in a direction to compensate for angular movement of the base plate 106. This adjustment maintains the axes of the center points 50 and 142 parallel with the longitudinal axis of the table 24 and positions the workpiece 178 carried by the center points properly at right angles to the working face of grinding wheel 30. The plate 120 which mounts the cam support 114 on base plate 68 is then adjusted transversely on the latter to center the cam 112 properly with respect to the adjacent end of spindle 74.

A "no cam" type of cam 112 is employed, and the cam support 114 is adjusted angularly on the supporting plate 120 to cock the cam face angularly with respect to the confronting face of gear 104. The reamer 178 here shown by way of illustration has six longitudinal cutting teeth 182, and six pins 116 are provided in equispaced relation around the gear 104.

When the parts of the grinding machine are arranged as described above, rotation of gear 104 will cause the pins 116 to rotate on cam 112; and, due to its cocked position with respect to the gear, the cam will cause the spindle to advance axially a predetermined distance each time a pin 116 traverses the portion of the cam face disposed nearest the gear. Thus, although the entire cam faces lies in a single plane the portion nearest the gear 104 becomes a high point on the cam. As each pin 116 rides upwardly on the high point of the cam 112, the spindle 74 advances against the action of spring 84 and as each pin rides downwardly away from the high point the spindle retracts. From the foregoing, it will be readily apparent that the spindle 74 will continue to retract until the next adjacent pin 116 begins to ride upwardly on the high point of the cam face. Manifestly, the amount of axial movement imparted to the spindle 74 will vary according to the angular position of the cam face. As the spindle 74 moves back and forth in support 66, it reacts through the workpiece 34 to impart a similar reciprocatory motion to the tailstock support 48 which in turn reciprocates back and forth against the action of spring 54.

From the above it will be readily apparent that, due to the angular position of the center member 48 in tailstock 22 and of the spindle 74 in headstock 20 with respect to the longitudinal axis of the table 24, reciprocation of the center member and spindle will move the workpiece 34 back and forth with respect to the working face of grinding wheel 30. Since the center member 48 and spindle 74 are disposed in parallel relation with respect to each other, this movement is accomplished without affecting the engagement of either center point with the work. Thus, the instant arrangement causes the workpiece to move toward and from the grinding wheel six times during each revolution of the work 34.

By properly positioning the workpiece 34 angularly on the centers 50 and 142, the work can be brought into engagement with the grinding wheel immediately behind the cutting edge 184 of each tooth 182. From this point, the work is fed toward the wheel 30 so that the latter grinds progressively more material from the tooth to provide progressively increasing clearance or relief on the surface 186 behind each cutting edge as shown in Fig. 7.

After grinding each tooth 182, the machine automatically retracts the workpiece 34 away from the grinding wheel 30 until the next adjacent tooth 182 moves into grinding position at which time the machine automatically advances the workpiece against the wheel to repeat the operation.

It will, of course, be apparent that the distance the workpiece 34 is moved to and from the grinding wheel 30 can be controlled either by angularly adjusting the center supports 38 and 66 or by angularly adjusting the cam support 114.

By mounting the cam support 114 so that the cam 112 also can be adjusted to control the movement of the workpiece in the above manner several advantages are obtained. For example, this feature is important when relieving two or more axial cutting edges on a workpiece where it is necessary or desirable to provide a different clearance for each tooth. In this case, the various clearances can be provided merely by adjusting the cam angularly about its vertical axis between two positions corresponding with the desired clearances; and it is unnecessary to disturb the position of the center supports or to remove the workpiece from the machine while making the adjustment.

Also, the machine can be made to grind either right-hand or left-hand relief merely by adjusting the cam angularly either to the right or to the left of neutral position. As a result of the instant arrangement of parts, no other adjustment is necessary in order to produce this result.

In general, a "no cam" type of cam can be used in any case where the clearance or relief to be ground is 180° or less. Thus, for most types of grinding operations only one cam is necessary since its rise and fall can be varied merely by adjusting it angularly about a vertical axis in the manner described. If a clearance or relief greater than 180° is to be ground, a cam having rise and fall must be provided. However, in practically every other case, a "no cam" type of cam can be adapted for the purpose at hand.

Figure 9:
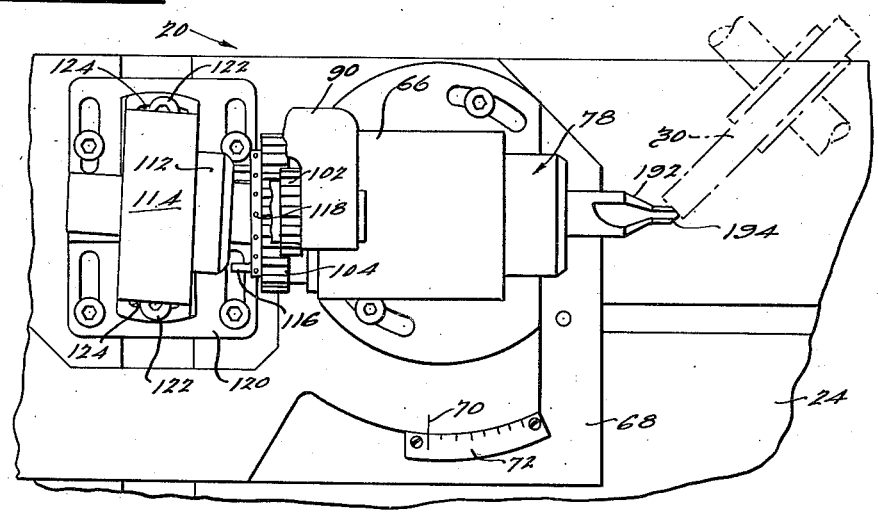
Fig. 9 is a view similar to Fig. 8 but illustrating a different typical grinding operation.
Figure 10:
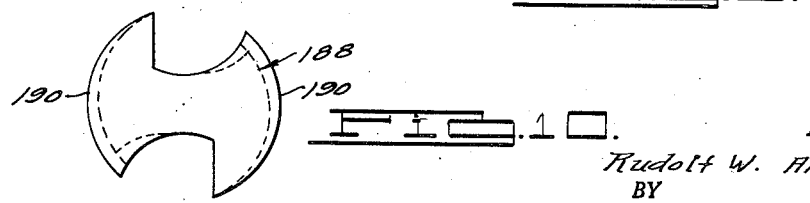
Fig. 10 is an end elevational view of the workpiece which is shown by way of illustration in Figs. 8 and 9.

Figs. 8, 9, and 10 illustrate still another set up for the machine. In this case the machine is adapted for grinding without centers and a workpiece designated generally by the numeral 188 is mounted directly in the spindle 74 in the manner hereinabove described. In the set up here shown, the support 66 is positioned at zero reading on the scale 72 so that the axis of the spindle is parallel with the longitudinal axis of the table 24. The clearance or relief to be ground on the workpiece 188 is less than 180° so that a "no cam" type of cam can be used. The support 114 which carries the cam 112 is adjusted angularly on the plate 120 to cock the cam face at an angle with respect to the adjacent end of the spindle (Fig. 8). As shown in Fig. 10, the workpiece 188 here shown by way of illustration has two cutting teeth and clearance is to be provided for each tooth. Consequently, two pins 116 are provided 180° apart on the gear 104. When grinding the upper shoulder 192 of the workpiece 188, the grinding wheel 30 is mounted at an angle corresponding to the angle of the shoulder as shown in Fig. 8. Thus, the workpiece 188 will be reciprocated twice during each revolution thereof; and, if the workpiece is properly positioned angularly in the chuck 78, it will engage the grinding wheel 30 immediately behind the cutting edge and be fed progressively against the wheel as the surface of the workpiece behind the cutting edge moves across the face of the wheel. After each tooth passes the wheel 30, the workpiece 188 is automatically retracted so that the workpiece does not again engage the wheel until the cutting edge of the next tooth has moved past the wheel. The operation is repeated for each tooth of the cutting element and the entire sequence of operation is automatic.

The same set up may be used to grind a point 194 on the workpiece 188, as shown in Fig. 9.

Figure 11:
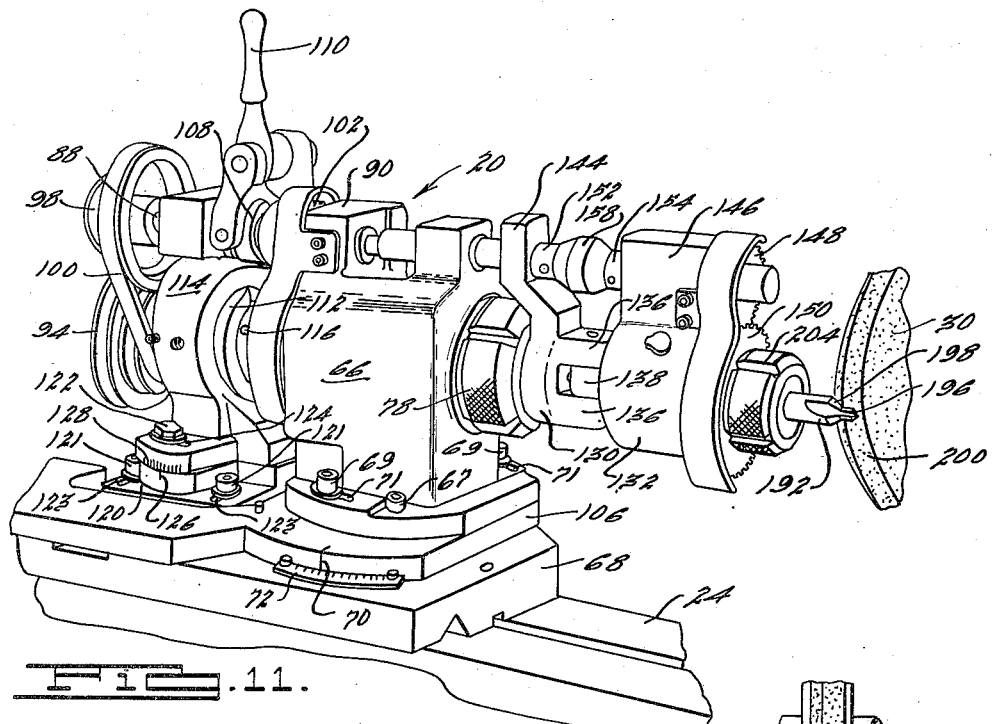
Fig. 11 is a perspective view showing a fragmentary portion of the grinding machine and a fragmentary portion of a grinding wheel in operative association therewith, the machine being set up to grind end clearance on a center drill and simultaneously to grind a relief on the outside diameter of the work.
Figure 12:
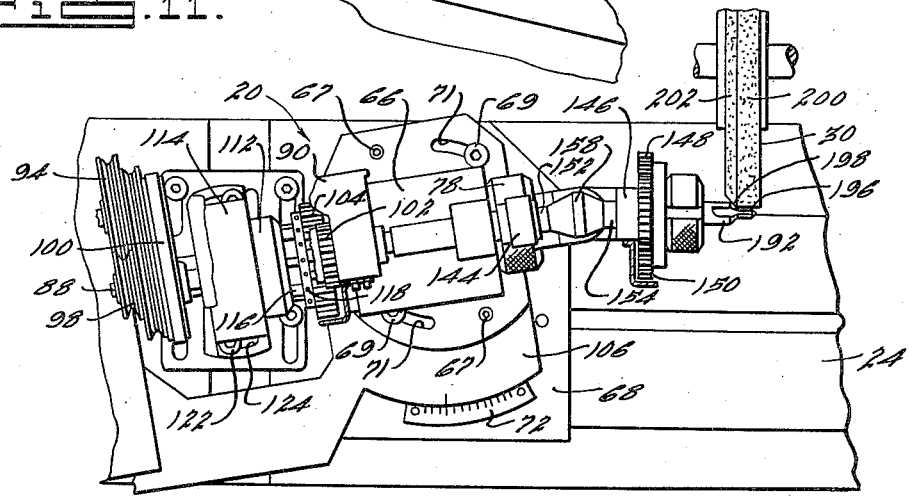
Fig. 12 is a top plan view of the same.

In Figs. 11 and 12, I have shown a machine of slightly modified construction, which machine is set up to grind a relief on the outside diameter or lands of a cutting tool and at the same time to grind end clearance therefor. A center drill is a typical workpiece requiring this type of grinding operation, and a workpiece of this character is shown in the machine. The center drill 192 here shown has two cutting flutes (Fig. 10). The machine is set up to grind a relief on each land of the center point 196 and simultaneously to grind an end clearance on the tapered shoulder 198. The particular grinding operation here under consideration requires a grinding wheel which is dressed or shaped to complement the profile of the workpiece defined by the center point 196 and the shoulder 198. Thus, the grinding wheel 30 here shown has a flat annular peripheral surface 200 which engages the periphery of center point 196 and an adjacent tapered annular surface 202 which engages the shoulder 198.

In the grinding operation here under consideration, only the headstock portion of the machine is used and the center point adapter unit is attached thereto for operation in the manner hereinabove described. However in this form of the invention, a collet chuck 204 is carried by the gear 150 in place of the center point 142. As clearly shown in the drawing, the workpiece 192 is mounted in the collet chuck 204 and is rotatably driven by the gear 150 in an obvious manner. Except for the difference in construction specifically referred to above, both the headstock and the center point adapter unit are identical to the corresponding mechanisms described in detail in the foregoing portion of the specification.

To set up the machine, the headstock support 66 is adjusted angularly by loosening bolts 69 and moving the supporting plate 106 to the desired angular position as indicated on the scale 72. The screws 69 are then tightened to hold the headstock support 66 and supporting plate 106 in the selected adjusted position. After the above adjustment has been made, the front bracket portion 132 is moved angularly with respect to the rear bracket portion 130 an equal amount in a reverse direction so that the longitudinal axis of workpiece 192 is parallel with the table 24. The cam support 116 is similarly adjusted angularly in order to impart a reciprocating motion to the workpiece. This operation is effected by loosening the screws 122 and angularly adjusting support 114 on plate 120, the screws 122 are then tightened to hold the cam support 114 in the selected adjusted position. The grinding wheel 30 is then positioned on the machine so that the grinding surfaces 200 and 202 properly engage surfaces 196 and 198 respectively of the workpiece 192.

Adjustment of the headstock support 66 determines primarily the amount of relief which will be ground on the outside lands of the center point 196, and adjustment of the cam support 114 determines the amount of end clearance to be ground on the shoulder 198. In the present set up, a "no cam" type of cam may be used and the gear 104 is equipped with two pins 116 disposed 180° apart and properly correlated angularly with respect to the cutting flutes of the workpiece as described in connection with the description of Figs. 8, 9, and 10. It will be readily apparent however that other types of cams and a different pin arrangement may be conveniently or necessarily employed when other types of cutting tools or other workpieces are being ground.

When the machine is set into operation by actuation of handle 110 to engage clutch 108, workpiece 192 is continuously rotated and simultaneously reciprocated by engagement of pins 116 with the cam 112. As suggested, the amount of movement of the workpiece back and forth relative to the cutting surfaces of the grinding wheel 30 depends primarily upon the angular setting of plate 106. Consequently, the amount of clearance which will be ground on the outside diameter or lands of the center point 196 will depend upon the angular position of the support 66 and plate 106. On the other hand, the amount of axial movement between the workpiece 192 and the grinding wheel 30 is determined primarily by the angular position of the cam support 114. Consequently, the amount of end clearance provided for on the shoulder 198 will depend primarily upon the particular adjusted position of the cam support. From the foregoing, it will be readily apparent that at the O. D. relief and the end clearance will be ground simultaneously and that these separate grinding operations may be individually controlled by one or the other of the adjustments referred to above.

Figure 13:
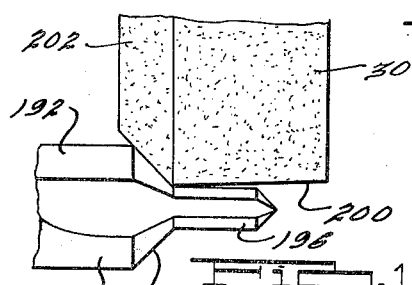
Fig. 13 is a view showing a fragmentary portion of a grinding wheel in operative association with a center drill workpiece, the grinding wheel being shaped to grind back clearance on the work as well as the grinding operations described in connection with the description of Fig. 11.

In addition to the above, a desired amount of back clearance can be provided on the center point 196 by dressing the wheel 30 so that the cutting face 200 thereof engages the center point as shown in Fig. 13. When the grinding wheel is dressed in this manner, a radial relief can be ground on the lands of the cutting flutes, end clearance can be ground on the shoulder 98, and back relief provided for the center point. All three of these grinding operations are made simultaneously and each operation can be separately controlled either by dressing the cutting surfaces of the grinding wheel to the desired shape or by adjusting some part of the machine.

It is to be understood that the forms of the invention herewith shown and described are to be taken as preferred examples of the same and that various changes in the size, shape, and arrangement of parts may be resorted to without departing from the spirit of the invention or the scope of the appended claims.

Having thus described the invention, I claim:

1. In a grinding machine, a headstock having a rotatable and reciprocable driving spindle, and a spindle support mounted for angular movement about an axis normal to the axis of rotation of said spindle; means for rotatably driving said spindle; a cam axially behind said spindle; cam follower means rotatable and reciprocable with the spindle and engageable with said cam; a carrier for said cam adjustable about an axis normal to the axis of rotation of said spindle; and a mounting for said carrier mounted for sliding adjustment in a direction normal to the axes of both the carrier and of the spindle.

2. In a grinding machine, a headstock comprising a supporting bracket having swiveled sections; work mounting means rotatably carried by one section of said bracket; a rotatable shaft having two axially spaced sections carried by respective sections of said bracket, one of said shaft sections having a driving connection with said work-mounting means; and a torsionally yieldable, flexible coupling connecting the two sections of said shaft.

3. In a grinding machine, a headstock having axially spaced shafts; a torsionally yieldable, flexible coupling connecting said shafts; a pair of swiveled members each rotatably supporting a respective one of said shafts; a center point for supporting one end and rotatably driving a workpiece to be ground rotatably carried by one of said members; means rotatably connecting said center point to one of said shafts, the parts so constructed and arranged that said flexible coupling permits angular adjustment between said shafts when one of said members is swiveled relative to the other and whereby said coupling will yield under heavy cuts in a direction to relieve pressure on the grinding wheel to prevent burning of the work; drive means; and clutch means connecting said drive means to the shaft remote from said center point.

4. In a grinding machine, a headstock comprising a support; a spindle journaled for rotation in said support; a pair of pivotally connected brackets, one of said brackets removably fastened to the spindle; work-mounting means in the other of said brackets; and drive means including a pair of shafts each journaled for rotation in a respective one of said brackets, a torsionally yieldable, flexible coupling connecting said shafts, and means for transmitting motion from said shafts to said work-mounting means.

5. In a grinding machine, a headstock comprising a support; a spindle journaled for rotation in said support; a pair of pivotally connected brackets, one of said brackets removably fastened to the spindle; work-mounting means in the other of said brackets; and drive means including a pair of shafts each journaled for rotation in a respective one of said brackets, a torsionally yieldable, flexible coupling connecting said shafts, means for transmitting motion from said shafts to said work-mounting means, gear means driven by said shafts for rotatably driving said spindle, and means for rotatably disconnecting said gear means from the spindle.

6. In a grinding machine, a headstock including a rotatable spindle; rotatable drive means; means for selectively connecting said rotatable drive means to the spindle, whereby said drive means can be utilized to rotatably drive the spindle or disconnected therefrom; and an adapter unit including support means detachably associated with and carried by the spindle, work-mounting means rotatably carried by the support means, a driven shaft detachably connected to the drive means, and means for transmitting motion from the driven shaft to said work-mounting means.

7. The combination as set forth in claim 6 wherein said support means comprises two pivotally connected bracket sections, and wherein said driven shaft comprises two shaft sections connected by a torsionally yieldable, flexible coupling, each of said shaft sections being rotatably supported by a respective one of said bracket sections.

8. In a grinding machine, spaced supports mounted in proximity to each other and each independently, angularly adjustable about a vertical axis; a cam carried by one of said supports having a vertically disposed annular cam face; a rotatable and reciprocable spindle assembly carried by the other of said supports disposed in horizontal alignment with said cam and with one end thereof in spaced, confronting relation with respect to said cam face; cam follower means carried by the spindle assembly and engageable with said cam face during rotation of the assembly; resilient means urging said spindle assembly in the direction of said cam; a horizontally adjustable base carrying said cam support; drive means; means for selectively connecting said drive means to the spindle assembly, whereby said drive means can be utilized to rotatably drive the spindle assembly or disconnected therefrom; and an adapter unit including support means detachably associated with and carried by the spindle, work-mounting means rotatably carried by the support means, a driven shaft detachably connected to the drive means, and means for transmitting motion from the driven shaft to said work-mounting means.

9. The combination as set forth in claim 8 wherein said support means comprises a pair of pivotally connected sections, and wherein said driven shaft comprises a pair of shaft sections each rotatably supported by a respective one of said support sections; and a torsionally yieldable, flexible coupling connecting the two sections of said driven shaft.

RUDOLF WILLIAM ANDREASSON.

REFERENCES CITED

The following references are of record in the file of this patent:

UNITED STATES PATENTS

| Number | Name | Date |
|---|---|---|
| 1,806,562 | Pickler | May 19, 1931 |
| 2,325,364 | Boening | July 27, 1943 |
| 2,363,482 | Clarke | Nov. 28, 1944 |
| 2,389,401 | Andreasson | Nov. 20, 1945 |
| 2,434,753 | Andreasson | Jan. 20, 1948 |

FOREIGN PATENTS

| Number | Country | Date |
|---|---|---|
| 518,625 | Great Britain | Mar. 4, 1940 |